Aug. 1, 1939.  E. S. PRESTON  2,167,995
ELECTRIC APPLIANCE
Filed May 20, 1938  2 Sheets-Sheet 1
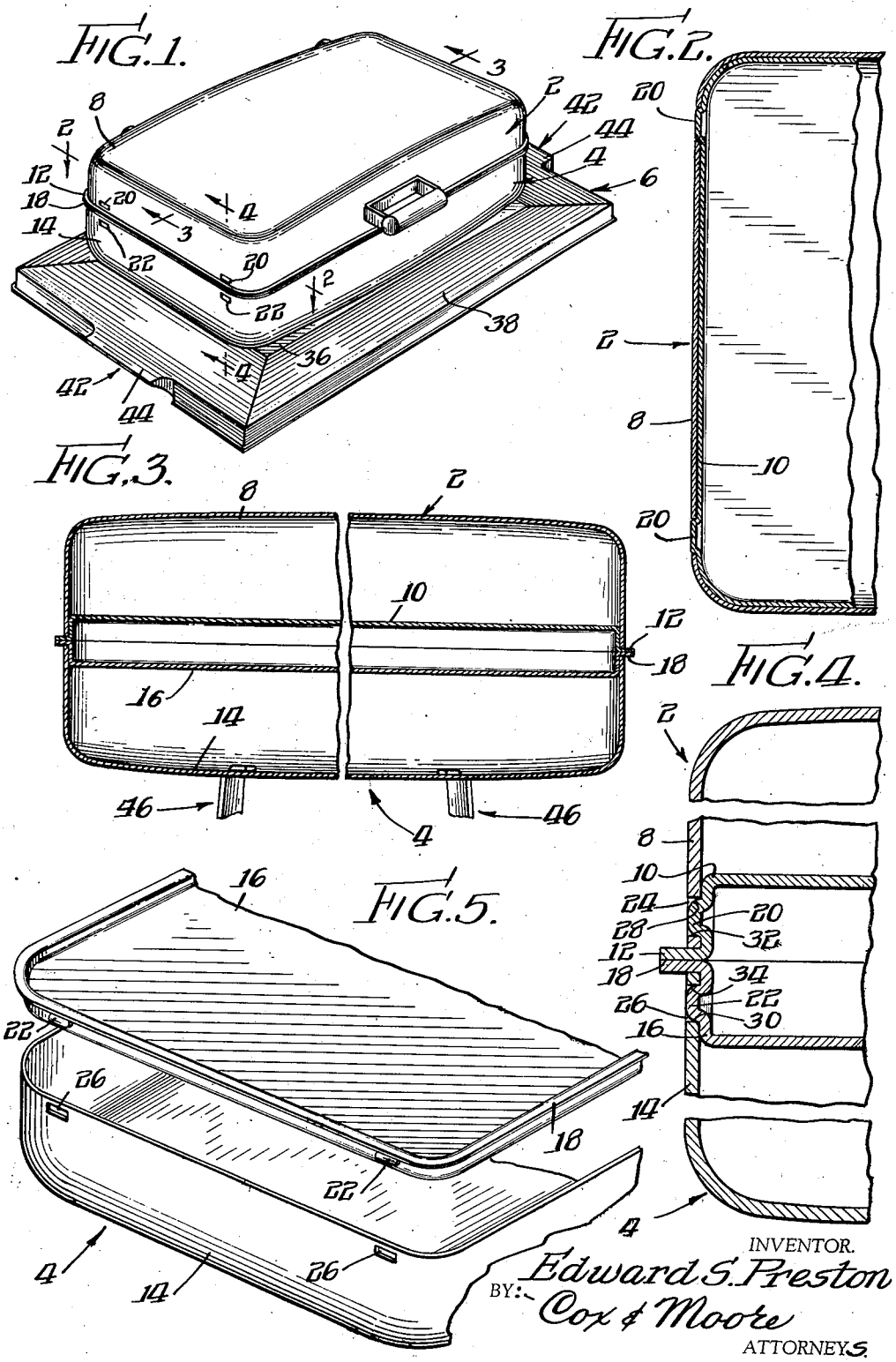
INVENTOR.
Edward S. Preston
BY: Cox & Moore
ATTORNEYS.

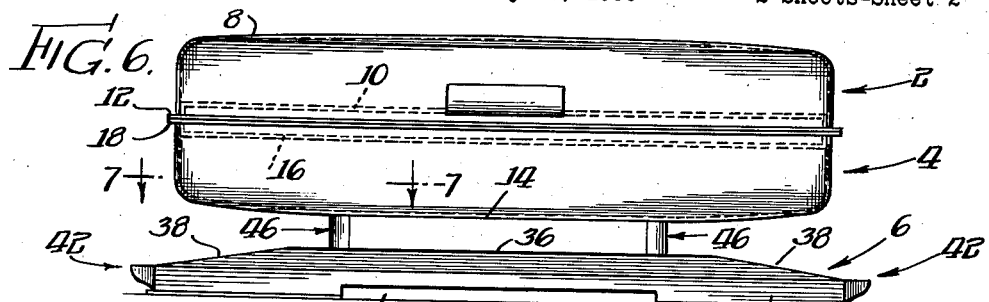

Patented Aug. 1, 1939

2,167,995

UNITED STATES PATENT OFFICE 2,167,995

ELECTRIC APPLIANCE

Edward S. Preston, Hinsdale, Ill., assignor to Chicago Electric Manufacturing Company, Chicago, Ill., a corporation of Illinois Application May 20, 1938, Serial No. 209,075

11 Claims. (Cl. 53—5)

This invention relates to an electric appliance and more particularly to an electric sandwich toaster or waffle iron.

It is an object of applicant's invention to provide an electric heating appliance and more particularly a sandwich toaster or waffle iron having a self supporting base upon which, by inexpensive means, the heating sections may be supported in spaced relation relative to the base so that the heat of the appliance will not be transmitted to the base and the heating appliance may therefore be positioned directly upon a table top or other supporting surface without detrimental heating of said top or surface.

A further object of applicant's invention is to provide a sandwich toaster or waffle iron of the low mounted type having a substantially flat supporting base of inexpensive construction having integrally formed handle members, the heating section or sections being supported upon the base in spaced relation thereto so that the heat of said section or sections will not be transmitted to the base and the base and the integrally formed handle members will therefore be maintained in a relatively cool condition.

A still further object of applicant's invention is to provide means which may be inexpensively formed in the heated member or plate and the casing or shell for coupling these elements together in a firm and rigid manner, yet permitting their ready detachment for the purpose of repair or replacement of the elements mounted therebetween, more particularly the heating element, and for permitting the interchanging of heated members of different types, as for example a griddle and a waffle plate.

Other objects and advantages of the invention will be apparent from the following description when taken in connection with the accompanying drawings, wherein:

Fig. 1 represents a view in perspective of a heating appliance embodying the invention.

Fig. 2 is a fragmentary, horizontal section taken substantially along the line 2—2 of Fig. 1.

Fig. 3 is a vertical section taken substantially along the line 3—3 of Fig. 1.

Fig. 4 is a fragmentary, vertical section taken along the line 4—4 of Fig. 1.

Fig. 5 is a fragmentary view in perspective showing in enlarged detail the manner of coupling the heated member or griddle to its supporting shell.

Fig. 6 is a front view in elevation of the heating appliance of Fig. 1.

Fig. 7 is a fragmentary, horizontal section taken substantially along the line 7—7 of Fig. 6.

Fig. 8 is a fragmentary, vertical section taken substantially along the line 8—8 of Fig. 7.

Fig. 9 is a view in perspective of one of the elements forming the means of Figs. 6 to 8 for supporting the heating member or sections upon the base.

Fig. 10 is a fragmentary view in elevation of a heating appliance embodying a modified form of means for supporting the heated member upon the base.

Fig. 11 is a fragmentary view in horizontal section taken substantially along the line 11—11 of Fig. 10.

Fig. 12 is a fragmentary, vertical section taken substantially along the line 12—12 of Fig. 11.

Fig. 13 is a view in perspective of an element of the supporting means of Figs. 10 to 12 and showing the manner of forming said elements integrally with the base.

As shown in the drawings, the heating appliance selected for the purposes of illustration comprises a sandwich toaster of a low mounted type having an upper heating section 2 hingedly connected to a lower heating section 4 supported upon a base 6. The heating section 2 comprises a generally pan shaped sheet metal shell 8 and a shallower sheet metal pan 10 having a laterally directed peripheral flange 12 extending over and resting upon the edge of the shell 8. In the form shown, the pan 10 forms a griddle for a sandwich toaster or the like, but it will be evident that this pan may be formed with the usual projections extending inwardly from the base of the pan to form a waffle plate. A heating element, not shown, may be secured to and within the shell and between the top of the shell and the heated plate or pan 10.

The lower heating section 4 similarly comprises a sheet metal pan or shell 14 and a shallower sheet metal pan 16 having a laterally directed peripheral flange 18 extending over and supported upon the edge of the pan 14. A second heating element, not shown, may be secured in the conventional manner to the shell 14 and between the base of the shell and the pan 16. The pan 16 may be formed similarly to the pan 10 to provide projections forming a waffle plate. Inexpensive means are provided for coupling the pan 10 to the shell 8 and for coupling the pan 16 to the shell 14 so that the pans 10 and 16 may be readily assembled in their respective shells by a minimum expenditure of labor and are yet entirely effective to rigidly support the pans in their respective shells.

This means comprises, as best shown in Figs. 1, 2, 4 and 5, a pair of spaced, substantially rectangular protuberances, ribs or ridges 20 struck out from the end walls of the pan 10. Similar protuberances, ribs or ridges 22 are struck out from the end walls of the pan 16. The ribs 20 of the pan 10 are snugly received within alined slots, apertures or openings 24 in the end walls of the shell 8. The protuberances, ribs or ridges 22 of the pan 16 are similarly received in alined slots, apertures or openings 26 in the end walls of the shell 14, the pans 10 and 16 and the shells 8 and 14 being of relatively resilient sheet metal.

The pans are readily assembled with the shells by applying a relatively slight amount of force on each pan inwardly of its shell, the curved outer edges 28 of the ribs 20 causing a deflection of the end walls of the shell 8 so that the ribs 20 snap into position in their cooperating slots 24, and the pan 10 is firmly clamped in the shell 8 by the resilience of said shell and by the engagement of the ribs 20 with the edges of the cooperating slots 24.

The curved edges 30 of the ribs 22 function in a similar manner to facilitate the assembly of the pan 16 and the shell 14 and the pan 16 is similarly held in the shell 14 by the resilience of said shell and by engagement of the ribs 22 with the edges of the cooperating slots 26.

The opposite curved edges 32 of the ribs 20 and the opposite curved edges 34 of the ribs 22 function similarly to the curved edges 28 and 30 to facilitate the detachment of the pans from their respective shells when it is desired to substitute one type of pan for another, as for example, when it is desired to substitute waffle plates for the griddle pans 10 and 16.

The base 6, upon which the lower heating section 4 is supported, preferably comprises, as shown best in Figs. 1, 6 and 8, a sheet metal tray having a substantially horizontal, flat supporting portion 36 underlying the greater portion of the shell 14, downwardly inclined portions or strips 38 connecting the central portion 36 to a vertical depending peripheral flange 40, the flange 40 forming a support for the base and spacing the appliance supporting surface of the base from the table top or other fixed supporting surface.

Opposite ends of the base 6 are provided with handle members 42 formed integrally with the base by means of portions 44 struck out from the depending peripheral flange 40 so as to extend laterally therefrom a sufficient distance above the bottom edge of said flange to form finger receiving openings between the portions 44 and the table top or other supporting surface. It should be noted that the handle members 42, being struck out from the depending flange 40, provide alined openings at opposite ends of the base which permit free circulation of air beneath the appliance supporting surface of the base to maintain the base at such a temperature that it may directly be placed upon the table top or other supporting surface without marring the same.

Means are provided for permitting a free circulation of air between the lower heating section and the base and also to maintain the supporting base at a relatively low temperature. This means comprises a plurality of longitudinally and laterally spaced supporting members 46 which support the lower heating section 4 in spaced relation to the supporting base. Each of the supporting members 46 (as best shown in Fig. 9) comprises a sheet metal clip or the like having a curved main body portion 48 of substantial width and lugs 50 and 52 of reduced width extending from the top and bottom edges of the main body portion 48. The lugs 50 and 52 extend through alined openings in the bottom of the shell 14 and the central portion 36 of the base 6 and are bent over into engagement with the inner surfaces of the bottom of the shell 14 and the central portion 36 of the base. The top and bottom edges of the main body portion 48, which extend outwardly from the lugs 50 and 52, provide shoulders 54 forming supporting surfaces engaging the outer surfaces of the bottom of the shell and the central portion 36 of the base. The curvature of the main body portion 48 of each supporting member 46 is made such that the shoulders 54 provide substantial lateral and longitudinal support for the shell 14.

As indicated in Fig. 7, the openings through which the lugs 50 extend into the shell 14 are formed in the base of the shell at an angle relative to the sides of the shell, the openings for the forward supporting members 46 being inclined oppositely with respect to the openings for the rearward supporting members. By this manner of securing the supporting members to the shell, the convex faces of the main body portion 48 of the supporting members are made to face the corners of the shell and the maximum resistance to relative movement of the heating appliance parallel to its supporting base is thereby obtained. By this arrangement, maximum resistance to turning of the appliance on its base is also obtained.

In the form shown in Figs. 10 to 13, the supporting members 46' are formed integrally with the base 6 being struck out from the base to provide a main body portion 56 integrally connected with the base and a lug 58 of reduced width extending upwardly from the portion 56. The supporting members 46', in this form of the invention having been struck from the central portion of the base in flat form, are then curved so that the body portion 56 has its concave face facing toward the center of the base.

As seen in Fig. 11, the longitudinal axis, along which the base is cut to form a forward supporting member 46', is inclined oppositely to the longitudinal axis along which the base is cut to form a rearward supporting member at the same end of the shell. The longitudinal axis of each cut made is directed substantially from the corner of the tray toward the center part of the tray. The upper edges of the main body portion 56 of each supporting member, which extend outwardly from the lug 58, provide shoulders 60 which engage the under surface of the bottom of the shell 14. The lug 58 of each supporting member passes through a suitable opening in the bottom of the shell 14 and is bent over into engagement with the inner surface thereof.

In this form of the invention shown in Figs. 9 to 13, the openings formed in the base by the struck-out supporting members 46' provide vent openings facilitating the circulation of air from opposite ends of the base through these openings into the space between the lower section 4 of the heating appliance and said base. This results in a greater cooling of the base.

If desired, the front and rear longitudinal portions of the peripheral flange 40 may be cut away or upwardly recessed, as at 62 in Fig. 6, to further increase the circulation of air through the base.

It will be evident from the foregoing description that applicant has provided a sandwich toaster or waffle iron having heating sections spaced from the base so that the heat of the sections is not conducted to the base and thence to the table top or other supporting surface.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A heating appliance comprising a shell and a heated member, said shell having slots therein and said member having ribs projecting into said slots for securing the heated member to the shell.

2. In an electric heating appliance, a relatively elongated pan shaped shell and a heated plate, said shell having spaced apart slots in opposite walls thereof and said plate having a laterally directed peripheral flange provided with spaced apart ribs struck therefrom and extending into said slots.

3. In an electric heating appliance, a pan shaped metal shell and a heated pan shaped plate within said shell, opposite walls of said shell having spaced apart slots therein and opposite walls of said plate having spaced apart, substantially rectangular ribs struck therefrom and extending into said slots, said pan shaped plate having an outwardly turned peripheral flange overlying the edge of said pan shaped shell.

4. In an electric heating appliance, a heating member, a supporting base, means for supporting said heating member on said base in spaced apart relation relative thereto to permit the circulation of air between said base and said heating member, said base comprising a tray having a peripherally extending and depending flange forming a support for said tray, portions of said depending flange extending outwardly therefrom to form integral handle members for said appliance.

5. In an electric heating appliance, a heating member, a supporting base, means for supporting said heating member on said base in spaced apart relation relative thereto to permit the circulation of air between said base and said heating member, said base having a flat central portion, an integral, inclined rim portion extending peripherally of said central portion and a vertical depending flange portion extending peripherally of said rim portion, opposite portions of said vertical flange being struck out to form substantially horizontal handle members and openings in said peripheral flange for permitting circulation of air beneath the central and rim portions of said base whereby to maintain said base in a relatively cool condition.

6. In an electric heating appliance, a heating member, a supporting base, means for supporting said heating member on said base in spaced apart relation relative thereto to permit the circulation of air between said base and said heating member, said base having a flat central portion, an integral, inclined rim portion extending peripherally of said central portion and a vertical depending flange portion extending peripherally of said rim portion, opposite portions of said vertical flange being struck out to form substantially horizontal handle members providing openings in said peripheral flange for permitting circulation of air beneath the central and rim portions of said base whereby to maintain said base in a relatively cool condition, said depending flange having additional openings therein to increase the circulation of air between the central and rim portions of the base and the supporting surface upon which the appliance may be mounted.

7. In an electric heating appliance, a heating unit comprising a metal shell and a heated member mounted within said shell, a supporting base, and means for supporting the shell of the heating unit in spaced relation relative to said supporting base to permit circulation of air between said shell and said base, said supporting means comprising a plurality of longitudinally and laterally spaced supporting clips, each having a concave-convex body portion secured to said supporting base and a lug of reduced width extending upwardly from said body portion, said shell having a plurality of longitudinally and laterally spaced openings to receive the lugs of said supporting clips, laterally spaced ones of said openings being inclined oppositely relative to the walls of said shell whereby the corresponding surfaces of the convex-concave body portion of these laterally spaced clips face toward the center of the shell and the other corresponding surfaces of said body portions face generally toward the adjacent corners of said shell thereby to prevent longitudinal and lateral movement of said shell relative to the base and also prevent twisting of said shell relative to the base.

8. In an electric heating appliance, a pan shaped metal shell and a heated pan shaped plate within said shell, opposite walls of said shell having spaced apart slots therein and opposite walls of said plate having spaced apart, substantially rectangular ribs struck therefrom and extending into said slots, said ribs each having a curved lower edge providing a cam surface adapted to deflect a wall of the shell during insertion of the plate in said shell whereby to facilitate the assembly of the plate and shell.

9. In an electric heating appliance, a pan shaped metal shell and a heated pan shaped plate within said shell, opposite walls of said shell having spaced apart slots therein and opposite walls of said plate having spaced apart, substantially rectangular ribs struck therefrom and extending into said slots, said ribs each having a curved upper edge providing a cam surface adapted to deflect a wall of the shell to permit detachment of the plate from the shell.

10. In an electric heating appliance, a heating unit comprising a metal shell and a heated member mounted within said shell, a supporting base, and means for supporting the shell of the heating unit in spaced relation relative to said supporting base to permit circulation of air between said shell and said base, said supporting means comprising a plurality of longitudinally and laterally spaced supporting members each having a body portion and lugs of reduced width extending oppositely from said body portion, said shell and said base having a plurality of pairs of alined openings to receive said lugs and said lugs being bent over within said shell and said base to secure each supporting member to said shell and to said base.

11. In an electric heating appliance, a heating unit comprising a metal shell member and a heated element mounted within said shell member, a supporting base member, and means for supporting the shell member of the heating unit in spaced relation relative to said supporting base member to permit circulation of air between said members, said supporting means comprising a plurality of longitudinally and laterally spaced supports struck out from one of said members and each comprising a body portion and a lug of reduced width extending away from said body portion, the other of said members having a plurality of laterally and longitudinally spaced openings to receive said lugs, said lugs being bent over within said other member to secure said other member to each of said supports.

EDWARD S. PRESTON.